April 17, 1962  J. M. PARAMYTHIOTI  3,029,889
POWER-TRANSMITTING SYSTEM
Filed Nov. 17, 1959  4 Sheets-Sheet 4

INVENTOR
JEAN MICHEL PARAMYTHIOTI
By Irwin S. Thompson
ATTY.

Patented Apr. 17, 1962

3,029,889
POWER-TRANSMITTING SYSTEM
Jean Michel Paramythioti, Rantigny, France, assignor to Societe Anonyme des Anciens Etablissements Albaret, Rantigny, France, a corporation of France
Filed Nov. 17, 1959, Ser. No. 853,629
Claims priority, application France Nov. 21, 1958
11 Claims. (Cl. 180—42)

The present invention has for its object a system for the transmission of power including a rocking shaft or rocking shafts arranged in alignment, said power-transmitting system being chiefly of interest for vehicles, the driving wheels of which are grouped by pairs associated each with an axle rocking in a plane perpendicular to the longitudinal axis of the vehicle and the load on which is to be distributed equally between the wheels, whatever may be the local modifications in ground level, this being the case, in particular, for automotive compacting rollers.

The invention covers, more particularly, a mechanically resistant power-transmitting system which is but little subject to wear and the operation of which is wholly reliable.

The power-transmitting system according to the invention is of the type including a rotary driving shaft, a rotary driving annulus, the axis of which is stationary with reference to the axis of said rotary shaft, means for coupling said rotary driving shaft with the rotary annulus for simultaneous movement thereof, while a second rotary shaft is adapted to rock round a center of oscillation and is controlled by said annulus. The power-transmitting system according to the invention is chiefly characterized by the fact that said annulus is arranged in at least substantial coaxial relationship with reference to the center of oscillation of the rocking shaft, while it is provided with at least one part-spherical bearing in registry with and spaced with reference to a cooperating part-spherical bearing provided on a spider keyed to said rocking shaft and a pusher member is pivotally secured through each of its part spherical ends through engagement with the associated part spherical bearings on the spider and on the annulus, to provide an operative driving connection between the last-mentioned parts.

Consequently, during the oscillations of the rocking shaft, the pusher members thus carried by ball and socket joints at each of their ends transmit the driving stresses in either direction, since the power-transmitting system is reversible.

The features and advantages of the present invention will appear clear from the reading of the following description of an embodiment, given by way of a mere example, reference being made to the accompanying drawings, wherein.

Figure 1:
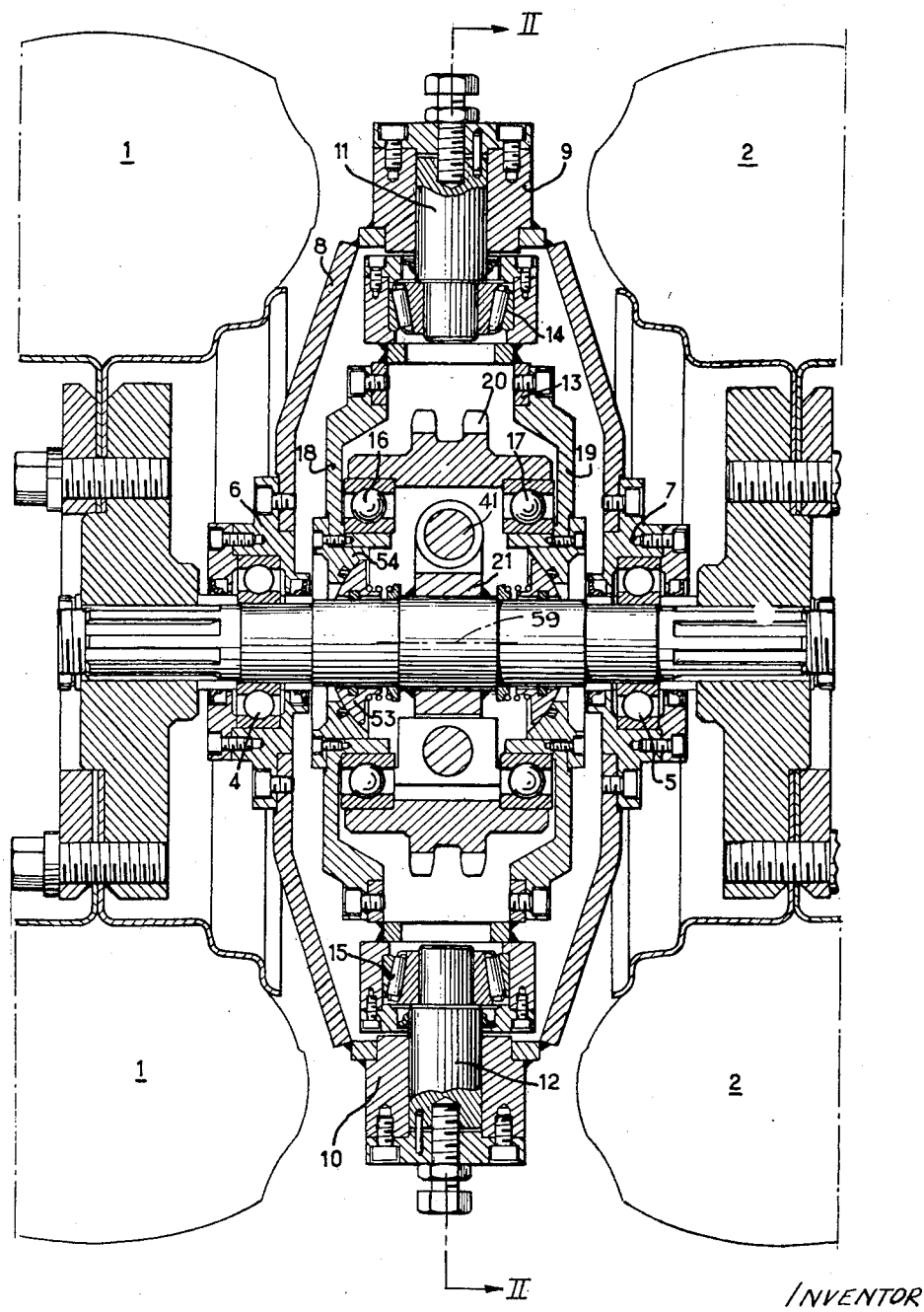
FIG. 1 is a plan view illustrating cross-sectionally said embodiment in a plane parallel with the plane over which the vehicle engages the ground and passing through the axis of the axle associated with the improved power-transmitting system.

In the embodiment illustrated by way of example, the improved power-transmitting system is applied to a pair of driving wheels 1 and 2 rigid with a rotary driving axle or shaft 3, which latter is mounted through the agency of the roller bearings 4 and 5 in two supports 6 and 7 rigid with the main casing 8. Said casing 8 is provided with two cylindrical housings 9 and 10 arranged in alignment and carrying rigidly the corresponding trunnions 11 and 12. Said trunnions are revolvably carried in an auxiliary casing 13 through the agency of the roller bearings illustrated at 14 and 15 in FIG. 1, which allow the casing 8 to rock with the axle 3 round the axis of the trunnions. Said auxiliary casing 13 is rigidly secured to the vehicle chassis with the axis of the trunnions 11 and 12 extending longitudinally of the vehicle. Inside the casing 13 are fitted roller bearings 16 and 17, the inner races of which are rigidly secured to the corresponding bearing supports 18 and 19, the common axis of the roller bearings 16 and 17 extending along a transverse axis of the vehicle, i.e. an axis parallel with the axis of the axle 3 when the vehicle lies on a flat bearing surface.

On the outer races of the roller bearings 16 and 17 is fitted a toothed annulus 20 which is subjected to the driving stress applied thereto through a chain which is not illustrated.

Figure 2:
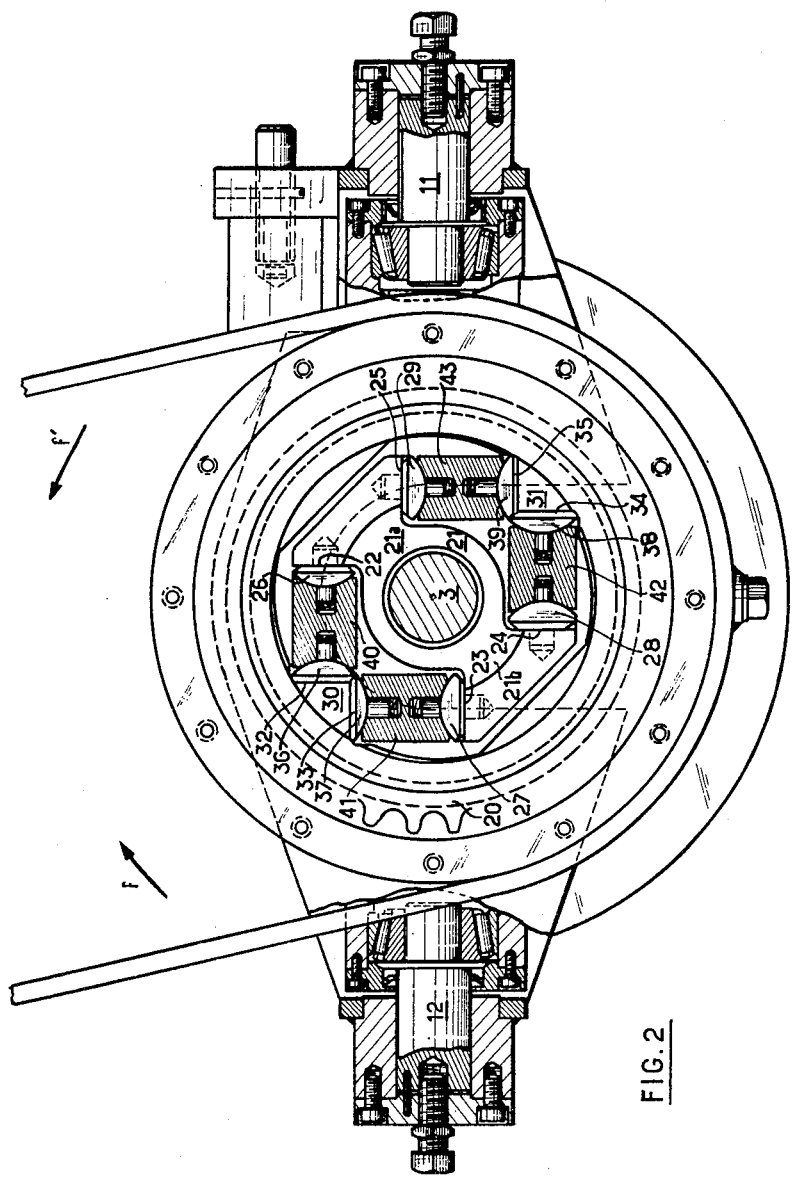
FIG. 2 is a side elevational view, partly sectional, through line II—II of FIG. 1.

To the axle 3 is locked, in registry with the inner surface of the annulus 20, a spider 21 including two outer projections or radial arms 21a, 21b provided each with two transverse surfaces 22—25 and 23—24 arranged, as illustrated in FIG. 2, at 90° from one another, each of said transverse surfaces carrying rigidly a bearing member in the shape of a convex spherical cap shown respectively at 26, 27, 28 and 29.

The driving annulus 20 is provided, on the other hand, with two inner projections of a triangular outline, illustrated at 30 and 31, in diametrical relationship with each other and provided with two transverse surfaces, 32, 33, 34 and 35 perpendicular to each other and registering respectively with the corresponding transverse surfaces 22 to 25 of the spider 21. A bearing member in the shape of a spherical cap is carried by each of said surfaces 32 to 35 on said triangular projections of the annulus, said caps being shown at 36, 37, 38 and 39.

It will be remarked that when turning round the axle 3, the observer will meet in succession two bearing members rigid with the spider 21 and two bearing members rigid with the annulus 20.

Between the associated bearing members lying in registry with each other on the spider 21 and on the annulus 20, i.e. between the pairs of caps designated by 26—36, 27—37, 28—38, 29—39, there are instrted links or pusher members terminating with semi-spherical ends, respectively at 40, 41, 42 and 43.

Figure 3:
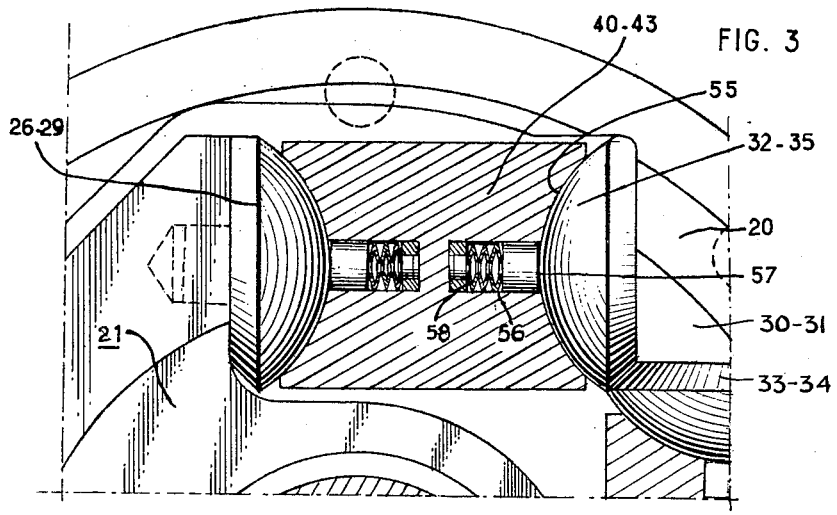
FIG. 3 is, on an enlarged scale, a sectional view of a pusher member associated with the cooperating bearing surfaces.

FIG. 3 shows how each pusher member 40—43 terminates with two concave part spherical surfaces, as illustrated at 55, for engagement over the cooperating convex spherical caps formed at 36—39 on the annulus 20 and at 26—29 on the spider 21.

Each concave terminal surface on each pusher member is provided with a blind recess 56 inside which may slide a small piston 57 subjected to the action of a compression spring 58, the object of said arrangement being disclosed hereinafter.

Figure 4:
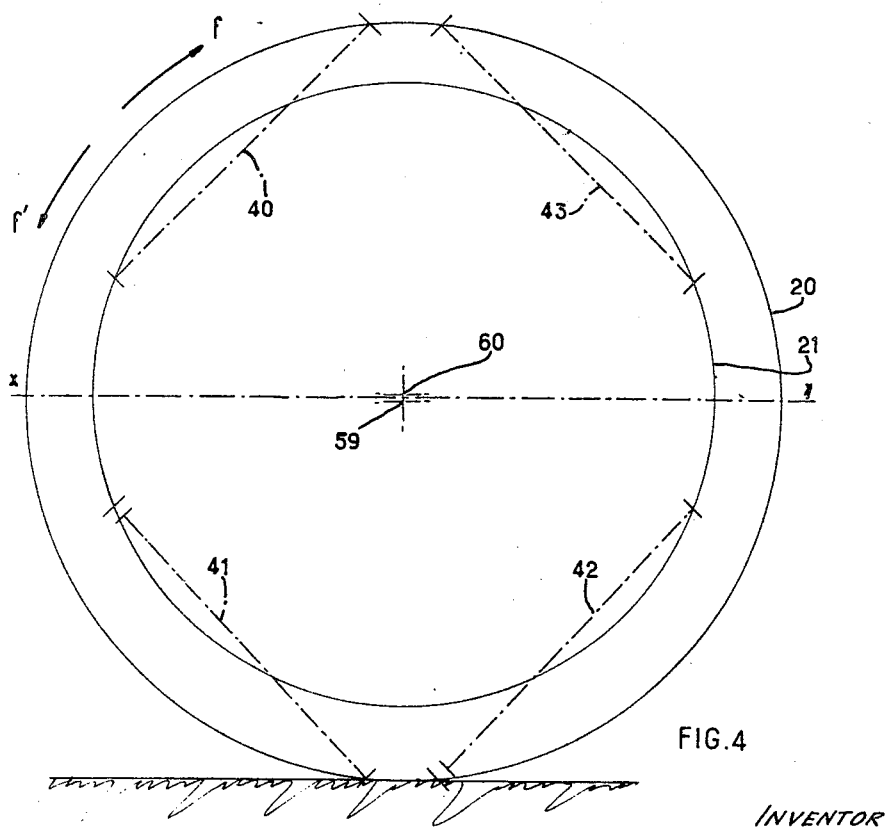
FIG. 4 is a diagram which allows understanding how the stresses transmitted through the pusher members during rotation of the axle are distributed.

The explanatory FIG. 4 shows that the center 59 of the annulus 20 is slightly eccentric with reference to the rocking axis of the axle 3 as shown at 60; the pusher members are illustrated diagrammatically by the locations of their axes at 40, 41, 42 and 43.

The operation of the power-transmitting system described is as follows: the auxiliary casing 13 being stationary with reference to the vehicle chassis, the axis of the annulus 20 is also stationary and, consequently, the transmission of power to the annulus 20 is performed normally through any means known per se adapted to ensure an operative connection between two movable elements which are not subjected to any relative shifting, such as a spacing and/or sloping of one element with reference to the other. In contradistinction, the casing 8 is pivotally secured round the longitudinal axis defined by the trunnions 11 and 12 and the axle 3 may rock freely round said axis, so that the wheels 1 and 2 may mate the local differences in ground level, while the load remains equally distributed between the wheels whatever such local differences in ground level may be.

The driving stress is transmitted from the annulus 20 to the spider 21 through the agency of the links or pusher members 40—43 acting in alternation as disclosed hereinafter. In the case of a rotation of the annulus 20 in the direction of the arrow $f$ (FIG. 4), the pusher members 40 and 42 transmit the stresses, while the pusher members 41 and 43 remain permanently inoperative. The axle 3 may thus turn freely within sufficiently large limits round the axis of the trunnions 11 and 12 without this modifying the manner of operating the transmission of the stresses, since the pusher members 40, 43 are held at their ends through ball-and-socket joints, whereby the connection between the spider 21 and the annulus 20 remains permanently ensured. It shoulde be remarked that by reason of the abutment described hereinabove which prevents the casing 8 from tilting, say beyond about 5° with reference to the inner casing 13, the spacing between the centers of the bearing surfaces at the opposite ends of each pusher member cannot exceed a very small amount which cannot be detrimental to the secure holding of the pusher members in the cooperating bearing surfaces.

It should lastly be remarked that the operative pusher members, acting for a predetermined rotary direction, transmit their stresses only intermittently as a consequence of the eccentricity given purposely to the annulus 20. As a matter of fact, it is readily apparent that, for a rotation in the direction $f$, only the pusher member 40 travelling over the upper half-circumference is operative, while the pusher member 42 travelling over the lower half-circumference is inoperative, since the spacing between the bearing surfaces on the cooperating caps 26—29 and 36—39 respectively formed on the annulus 20 and on the spider 21 is larger than the length of the pusher member. As soon as the pusher member 40 has passed through the plane XY perpendicular to the direction of eccentricity of the axle 20, it becomes inoperative, while the other pusher member 42 becomes operative in its turn.

The operation is thus the same as if the driving stress were transmitted through a single pusher member, to wit: alternatingly through the pusher members 40 and 42 for successive half revolutions.

It will be readily ascertained that, for a rotation in the opposite direction corresponding to the arrow $f'$, only that pusher member 41 or 43 is operative, which is travelling over the upper half-circumference, while the other pusher member 43 or 41 is inoperative as long as it remains in the part of its path corresponding to the lower half-circumference.

The release of each pusher member allows an outward movement of the corresponding piston 57 under the action of its spring 58, which leads to the successive periodical spacing at a frequency equal to the number of revolutions of the pusher members; consequently the operative ends of each pusher member are completely and frequently lubricated, said lubrication being performed for each passage of the pusher member through the oil bath at the lower end of the casing 13. Said lubrication allows reducing the wear to a considerable extent, although a single pusher member, instead of two, serves for the transmission of the driving stress at any moment.

It will be remarked that the embodiment illustrated for the ball-and-socket connections of the pusher members 40—43 shows the advantage of ensuring a lesser wear when compared to an embodiment incorporating a reversed shape for the pusher member, i.e. a pusher member having convex part spherical ends carried inside cooperating hollow part spherical bearing members since, as may be readily ascertained, the shifting allowed for the pusher members is shorter in the case illustrated, which leads also to a lesser wear for the same slope assumed by the axle 3, the circumstances remaining otherwise the same.

Figure 5:
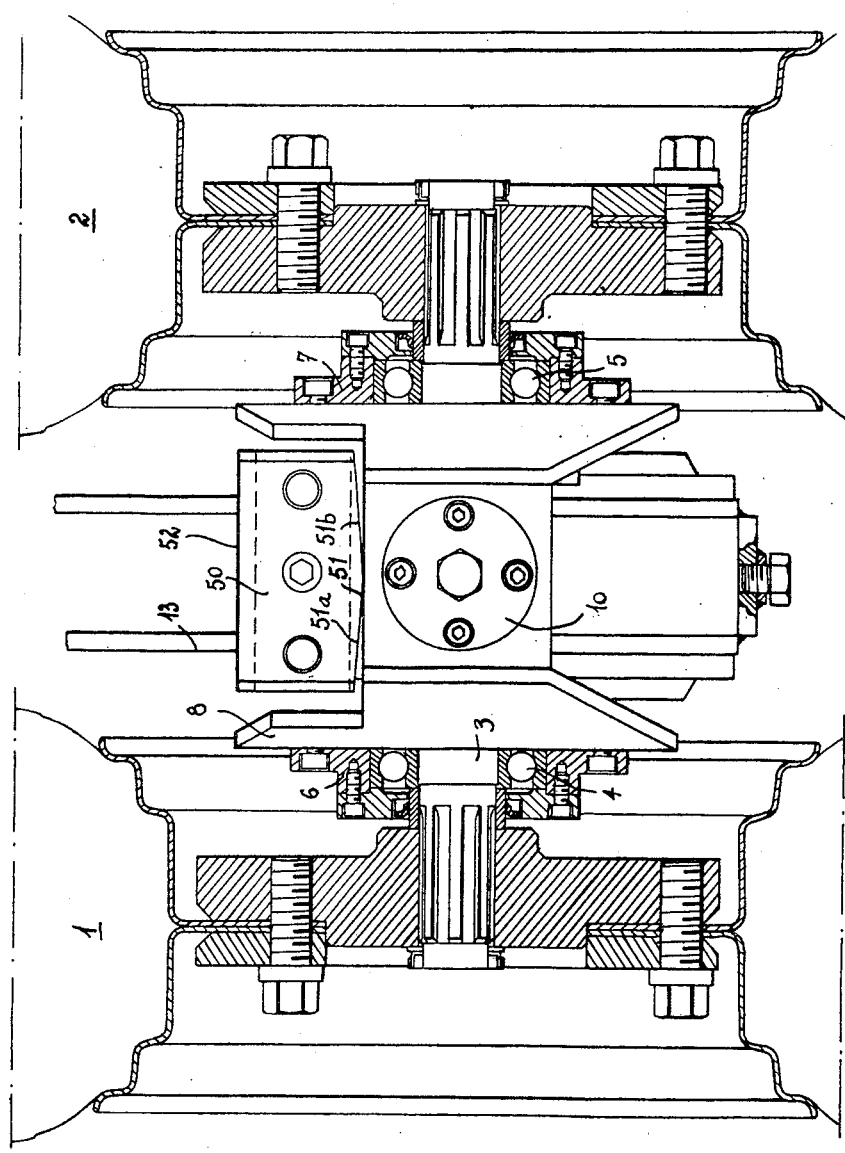
FIG. 5 is a partial elevational, partly sectional, view of the arrangement according to the invention.

In order to cut out any major oscillation of the driving axle 3, there is provided, as shown in FIG. 5, an abutment plate 50 bolted over the auxiliary casing 13 with a ridge 51 in the shape of a double sloping plane forming the dihedral $51a$—$51b$, said ridge, extending longitudinally of the vehicle chassis, bearing against the rocking casing along a line located in a vertical plane passing through the rotary axis of last-mentioned casing, the angular rocking movements of which are consequently limited through the abutment of said casing against either side $51a$ or $51b$ of the dihedral.

The abutment plate 50 is provided with a further ridge at 52 extending rectilinearly in a transverse direction along its upper surface, so that, upon a mere turning of the plate 50 upside down, it is possible to prevent any oscillation of the casing 8 which is then rigid with the casing 13 and, consequently, with the vehicle chassis.

It will be remarked that the casing 13 is fluidtight, as provided by the ball-and-socket joint 53 carried by the axle 3 and by the annular packings 54 carried by the casing. Thus, the casing 13 may contain a liquid lubricant, as disclosed precedingly.

The present invention is, of course, not limited to the sole embodiment selected by way of example and, obviously, the number of pusher members may vary.

What I claim is:

1. A power-transmitting system comprising in combination a rotary driving annulus, a rotary driven shaft extending through said annulus and including means mounting said shaft for rocking about an axis crossing its own axis and passing through a point slightly eccentric with reference to the center of the annulus, a spider rigid with the rotary shaft and housed inside the annulus and including radial arms provided each with two part-spherical bearing surfaces facing opposite directions of rotation of the shaft, inwardly directed projections rigid with the annulus and extending between the successive arms of the spider and each provided with two part-spherical bearing surfaces, each of said last named surfaces facing a corresponding bearing surface on the spider arm on the corresponding side of the projection, the cooperating bearing surfaces on the projections and on the spider arms being spaced with reference to each other, and pusher members fitted each between the bearing surfaces facing each other on the spider arm and the cooperating annulus projection and provided with part-spherical terminal surfaces mating and engaging said bearing surfaces on the spider arm and on the annulus projection respectively.

2. A power-transmitting system comprising in combination a rotary driving annulus, a rotary driven shaft extending through said annulus and including means mounting said shaft for rocking about an axis crossing its own axis and passing through a point slightly eccentric with reference to the center of the annulus, a spider rigid with the rotary shaft and housed inside the annulus and including radial arms provided each with two part-spherical convex bearing surfaces facing opposite directions of rotation of the shaft, inwardly directed projections rigid with the annulus and extending between the successive arms of the spider and each provided with two part-spherical convex bearing surfaces, each of said last named surfaces facing a corresponding bearing surface on the spider arm on the corresponding side of the projection, the cooperating bearing surfaces on the projections and on the spider arms being spaced with reference to each other, and pusher members fitted each between the bearing surfaces facing each other on the spider arm and the cooperating annulus projection and provided with part-spherical concave terminal surfaces mating and engaging said bearing surfaces on the spider arm and on the annulus projection respectively.

3. A power-transmitting system comprising in combination a rotary driving annulus, a rotary driven shaft extending through said annulus including means mounting said shaft for rocking about an axis crossing its own axis and passing through a point slightly eccentric with reference to the center of the annulus, a spider rigid with the rotary shaft and housed inside the annulus and including radial arms provided each with two part-spherical bearing surfaces facing opposite directions of rotation of the shaft, inwardly directed projections rigid with the annulus and extending between the successive arms of the spider and each provided with two part-spherical bearing surfaces, each of said last named surfaces facing a corresponding bearing surface on the spider arm on the corresponding side of the projection, the cooperating bearing surfaces on the projections and on the spider arms being spaced with reference to each other, pusher members fitted each between the bearing surfaces facing each other on the spider arm and the cooperating annulus projection and provided with part-spherical terminal surfaces mating and engaging said bearing surfaces on the spider arm and on the annulus projections respectively, and an oil casing enclosing at least the lower section of the annulus and of the spider.

4. A power-transmitting system comprising in combination a rotary driving annulus, a horizontal rotary driven shaft extending through said annulus including means mounting said shaft for rocking about an axis crossing its own axis and passing slightly above the center of the annulus, a spider rigid with the rotary shaft and housed inside the annulus and including radial arms provided each with two part-spherical bearing surfaces facing opposite directions of rotation of the shaft, inwardly directed projections rigid with the annulus and extending between the successive arms of the spider and each provided with two part-spherical bearing surfaces, each of said last named surfaces facing a corresponding bearing surface on the spider arm on the corresponding side of the projection, the cooperating bearing surfaces on the projections and on the spider arms being spaced 45 with reference to each other, pusher members fitted each between the bearing surfaces facing each other on the spider arm and the cooperating annulus projection and provided with part-spherical terminal surfaces mating and engaging said bearing surfaces on the spider arm and on the annulus projection respectively, an oil casing enclosing at least the lower section of the annulus and of the spider, and means for transiently shifting the pusher members slightly away from the associated bearing surfaces on the cooperating spider arms and annulus projections.

5. A power-transmitting system comprising in combination a rotary driving annulus, a horizontal rotary driven shaft extending through said annulus including means mounting said shaft for rocking about an axis crossing its own axis and passing slightly above the center of the annulus, a spider rigid with the rotary shaft and housed inside the annulus and including radial arms provided each with two part-spherical bearing surfaces facing opposite directions of rotations of the shaft, inwardly directed projections rigid with the annulus and extending between the successive arms of the spider and each provided with two part-spherical bearing surfaces, each of said last named surfaces facing a corresponding bearing surface on the spider arm on the corresponding side of the projection, the cooperating bearing surfaces on the projections and on the spider arms being spaced with reference to each other, pusher members fitted each between the bearing surfaces facing each other on the spider arm and the cooperating annulus projection and provided with part spherical terminal surfaces mating and engaging said bearing surfaces on the spider arm and on the annulus projection respectively, an oil casing enclosing at least the lower section of the annulus and of the spider, said pusher members being provided with blind bores opening into their terminal bearing surfaces, compression springs housed in said blind bores of the pusher members, and pistons fitted in said blind bores and urged outwardly by the compression springs therein towards the cooperating bearing surfaces.

6. A power-transmitting system comprising in combination a rotary driving annulus, an inner stationary casing revolvably carrying the annulus in a substantially vertical plane, a horizontal rotary driven shaft extending through said annulus, an outer casing revolvably carrying the driven shaft round its axis and revolvably carried by the inner casing about an axis passing slightly above the center of the annulus, a spider rigid with the rotary shaft and housed inside the annulus and including radial arms provided each with two part-spherical bearing surfaces facing opposite directions of rotation of the shaft, inwardly directed projections rigid with the annulus and extending between the successive arms of the spider and each provided with two part-spherical bearing surfaces, each of said last named surfaces facing a corresponding bearing surface on the spider arm on the corresponding side of the projection, the cooperating bearing surfaces on the projections and on the spider arms being spaced with reference to each other, and pusher members fitted each between the bearing surfaces facing each other on the spider arm and the cooperating annulus projection and provided with part-spherical terminal surfaces mating and engaging said bearing surfaces on the spider arm and on the annulus projection respectively.

7. A power-transmitting system comprising in combination a rotary driving annulus, a rotary driven shaft extending through said annulus and including means mounting said shaft for rocking about an axis crossing its own axis and passing slightly above the center of the annulus, a spider rigid with the rotary shaft and housed inside the annulus and including two diametrically opposed radial arms provided each with two part-spherical bearing surfaces facing opposite directions of rotation of the shaft, two diametrically opposed inwardly directed projections rigid with the annulus and extending between the successive arms of the spider and each provided with two part-spherical bearing surfaces, each of said last named surfaces facing a corresponding bearing surface on the spider arm on the corresponding side of the projection, the cooperating bearing surfaces on the projections and on the spider arms being spaced with reference to each other, and four pusher members fitted each between the bearing surfaces facing each other on the spider arm and the cooperating annulus projection and provided with part-spherical terminal surfaces mating and engaging said bearing surfaces on the spider arm and on the annulus projection respectively.

8. A power-transmitting system on the chassis of a vehicle, comprising a rotary driving annulus controlled by a driving shaft and the axis of which extends transversely of the vehicle, an axle shaft extending through the annulus with its axis slightly above the center of the annulus, a main casing inside which the axle shaft is revolvably carried, an oil-filled casing stationary with reference to the vehicle chassis and enclosing the annulus and about which said first main casing is mounted for rocking about an axis extending longitudinally of the vehicle chassis, said last mentioned axis crossing the axis of the axle shaft and passing slightly above and across the axis of the annulus, a spider rigid with the axle shaft and housed inside the annulus and including radial arms each of which is provided with two part-spherical bearing surfaces facing opposite directions of rotation of the shaft, inwardly directed projections rigid with the annulus and extending between the successive arms of the spider and each being provided with two part-spherical bearing surfaces, each of said last named surfaces facing the corresponding bearing surface on the spider arm on the corresponding side of the projection, the cooperating bearing surfaces on the projections and on the spider arms being spaced with reference to each other, said annulus and spider being immersed in their lower portion in said oil-filled casing, and pusher members fitted each between the bearing surfaces facing each other on the spider arm and the cooperating annulus projection and provided with part-spherical terminal surfaces mating and engaging said bearing surfaces on the spider arm and on the annulus projection respectively.

9. A power-transmitting system comprising in combination a rotary driving annulus, an inner oil-filled casing revolvably carrying the annulus in a substantially vertical plane, a horizontal rotary driven shaft extending through said annulus, an outer casing revolvably carrying the driven shaft round its axis and revolvably carried by the inner casing round an axis passing slightly above the center of the annulus, a spider rigid with the rotary shaft and housed inside the annulus and including radial arms each of which is provided with two part-spherical bearing surfaces facing opposite directions of rotation of the shaft, inwardly directed projections rigid with the annulus and extending between the successive arms of the spider and each being provided with two part-spherical bearing surfaces facing each of the corresponding bearing surfaces on the spider arm on the corresponding side of the projection, the cooperating bearing surfaces on the projections and on the spider arms being spaced with reference to each other, a fluidtight ball-and-socket joint fitted between the driven shaft and the oil-filled casing, and pusher members fitted each between the bearing surfaces facing each other on the spider arm and the cooperating annulus projection and provided with part-spherical terminal surfaces mating and engaging said bearing surfaces on the spider arm and on the annulus projection respectively.

10. A power-transmitting system on the chassis of a vehicle, comprising a rotary driving annulus controlled by a driving shaft and the axis of which extends transversely of the vehicle, an axle shaft the axis of which extends slightly above the center of the annulus, a main casing inside which the axle shaft is revolvably carried, an oil-filled casing stationary with reference to the vehicle chassis and enclosing the annulus and rockably mounting said first main casing about an axis extending longitudinally of the vehicle chassis, said last mentioned axis crossing the axis of the axle shaft and passing slightly above and across the axis of the annulus, a plate securable to the oil-filled casing in an erect position and in a reversed position selectively, said plate being provided along its horizontal terminal surfaces respectively with a ridge extending rectilinearly horizontally and transversely of the chassis and with a dihedral angle, said dihedral angle providing a ridge which extends longitudinally of the vehicle chassis, said ridges being adapted to engage selectively the upper surface of the main casing respectively to hold the latter against rocking when said plate is secured in one of said positions and to allow rocking of said main casing within extreme angular positions defined by the engagement of the sides of the dihedral angle with said upper surface of the main casing when said plate is secured in the other of said positions, a spider rigid with the rotary shaft and housed inside the annulus and including radial arms, each of said arms being provided with two part-spherical bearing surfaces facing opposite directions of rotation of the shaft, inwardly directed projections rigid with the annulus extending between the successive arms of the spider and each being provided with two part-spherical bearing surfaces facing each of the corresponding bearing surfaces on said arms on the corresponding side of the projections, the cooperating bearing surfaces on the projections and on the spider arms being spaced with reference to each other, said annulus and spider being immersed in their lower portion in said oil-filled casing, and pusher members fitted each between the bearing surfaces facing each other on the spider arm and the cooperating annulus projection and provided with part-spherical terminal surfaces mating and engaging said bearing surfaces on the spider arm and on the annulus projection respectively.

11. A power-transmitting system comprising in combination a rotary driving annulus, a rotary driven shaft extending through said annulus and including means mounting said shaft for rocking about an axis crossing its own axis, a spider rigid with the rotary shaft and housed inside the annulus and including radial arms provided each with two part-spherical bearing surfaces facing opposite directions of rotation of the shaft, inwardly directed projections rigid with the annulus and extending between the successive arms of the spider, each inwardly directed projection provided with two part-spherical bearing surfaces, each of said last named surfaces facing a corresponding bearing surface on the spider which are on the corresponding side of the projections, the cooperating bearing surfaces on the projections and on the spider arms being spaced with reference to each other, and pusher members fitted each between the bearing surfaces facing each other on the spider arm and the cooperating annulus projection and being provided with part-spherical terminal surfaces mating and engaging said bearing surfaces on the spider arm and on the annulus projection respectively.

References Cited in the file of this patent

UNITED STATES PATENTS

| | | |
|---|---|---|
| 343,910 | Leigh | June 15, 1886 |
| 1,097,261 | Platt | May 19, 1914 |
| 1,214,151 | Geer | Jan. 30, 1917 |
| 1,950,567 | Race | Mar. 13, 1934 |